Dec. 1, 1970 W. F. VANOVER ET AL 3,543,507
EXPANSIBLE LINKAGE FOR USE IN MAKING A WATCHBAND
OR SIMILAR ARTICLE OF JEWELRY
Filed Nov. 29, 1968 2 Sheets-Sheet 1
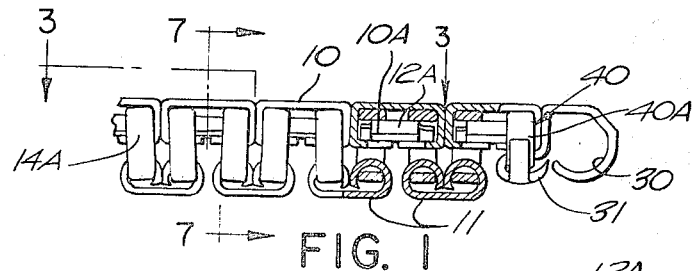
FIG. 1
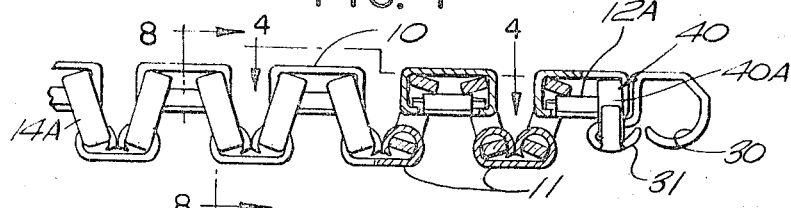
FIG. 2
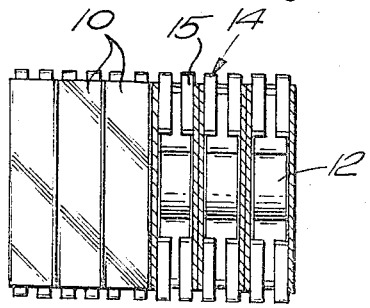
FIG. 3
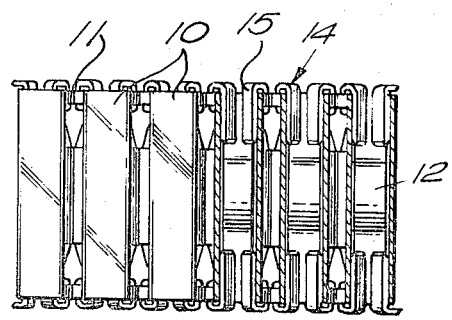
FIG. 4
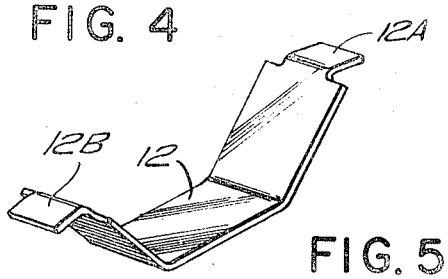
FIG. 5
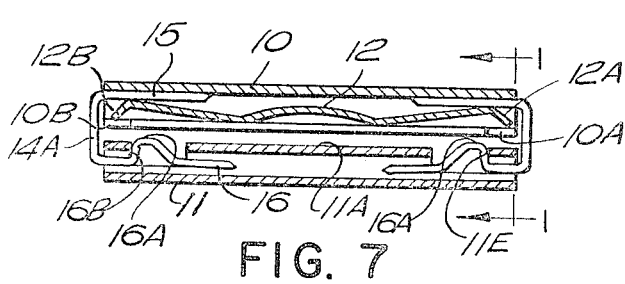
FIG. 7
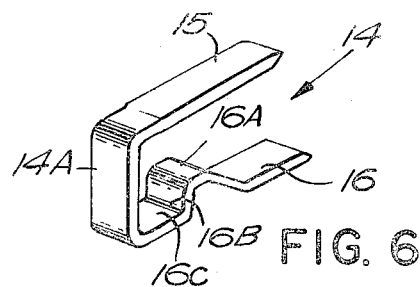
FIG. 6
FIG. 8
INVENTORS
WALLACE F. VANOVER
MAX FLAIG
BY
*Dike, Thompson & Bronstein*
ATTORNEYS

United States Patent Office 3,543,507
Patented Dec. 1, 1970

3,543,507
EXPANSIBLE LINKAGE FOR USE IN MAKING A WATCHBAND OR SIMILAR ARTICLE OF JEWELRY
Wallace F. Vanover and Max Flaig, Warwick, R.I., assignors to Textron Inc., Providence, R.I., a corporation of Delaware
Filed Nov. 29, 1968, Ser. No. 779,888
Int. Cl. F16g 13/24
U.S. Cl. 59—79          8 Claims

ABSTRACT OF THE DISCLOSURE

An expansible linkage for use as a bracket having two rows of overlapping staggered links, connecting members displaceably connecting the links of the first row to the links of the second row and springs in the first row for urging the links from their expanded to their contracted positions. The springs are located only in the links of the first row of links. The connecting members are provided with protrusions which cooperate with openings provided in the inner walls of the second row of links to prevent the accidental withdrawal of the connecting members from the linkage.

BACKGROUND OF THE INVENTION

This invention relates to an expandable linkage for use in making a watch bracelet, an identification bracelet or similar articles of jewelry.

One of the most satisfactory types of expansible linkages which have been used for making watch and identification bracelets since 1951 includes two rows of overlapping staggered links in which each link extends in a direction generally transverse to the length of the linkages. U-shaped connecting members having legs located located within the links of the upper and lower rows connect the links to each other. At least one flat spring is located within each link and extends from an intermediate portion of one wall of the link to engage the legs with an initial deflection. The initial deflection of all of the springs is sufficient to urge the links of the band to fully contracted position. The ends of the springs which engage the legs are further deflected when the linkage is expanded by stretching it to slip a wristwatch and bracelet over the hand of the wearer to his or her wrist. When the stretching force is released, the springs act upon the legs and the legs act upon the links to cause the links to return to a nearly contracted position in which the linkage grips the wrist with sufficient pressure to prevent movement thereof longitudinally of the wrist but without enough pressure to cause discomfort to the wearer. In removing the watch and bracelet from the wrist, the linkage is expanded by stretching it and the combination is pulled over the wearer's hand and released, whereupon the linkage returns to fully contracted position. This type of linkage is disclosed in U.S. Pats. 2,689,450 to Karl E. Stiegele, and 3,307,348 to Wallace F. Vanover. Other modifications are known to persons skilled in the art.

In the type of construction shown in said Stiegele patent, the inner surfaces of the legs of the U-shaped connecting members are provided with depressions or notches which are engaged by bent portions of the springs to hold the connecting members in the linkage. In this type of linkage, it has been found to be necessary to make either the outer ends of the springs or said bent portions of the springs long enough so that they engage the walls of the inner links when the connecting members are withdrawn to adjust the length of the bracelet. Unless this is done, the connecting members accidentally fall out of the linkage during use and the user either loses his watch and bracelet or must return it for repair.

Furthermore, as the connecting members are inserted in the links by mechanical means during assembly, when the ends of the springs or said bent portions of the springs engage the walls of the inner links during the latter part of the assembly step, such engagement causes resistance to further inward movement of the connecting members which frequently causes lateral movement of the springs and shutting down the mechanical assembly operations becomes necessary so that assembly of such linkage is expensive.

Also, because there are springs in both rows of links and the legs of the connecting members are relatively thick heightwise of the links the linkage is thick and the longitudinal expansibility of the linkage is limited.

In the type of construction shown in said Vanover patent, the U-shaped connecting members have straight legs and they are held in the links by tabs which are bent from the ends of the links to obstruct withdrawal of the connecting members. While this construction provides a thinner linkage than the Stiegele linkage with greater longitudinal expansibility it is expensive to manufacture because there are springs in both rows of links and because it is necessary to bend the tabs on the ends of the links of both rows of links during assembly of the linkage.

BRIEF SUMMARY OF THE INVENTION

One object of this invention is to provide a durable expansible linkage for use in a bracelet which can be manufactured more economically than the aforesaid prior art constructions.

Another object is to provide such a linkage in which the connecting members are held in the linkage securely and which does not rely upon springs to hold them in the links.

Another object is to provide such a linkage which is thinner than the prior art linkages.

Yet a further object is to provide such a linkage which has great expansibility.

Another object is to provide such a linkage which has enough expansibility to permit separate top shells to be assembled about the top links and still provide a linkage which when attached to a wristwatch has sufficient expansibility to be slipped on and off the wrist of the wearer.

Further objects and advantages of the invention will be apparent to persons skilled in the art from the following description.

In general, the invention comprises using springs in the links of only the first row of links and certain configurations of the inner walls of the links of the second row of links and of the connecting member legs which extend into the links of the second row of links, all of which combine in a novel manner to accomplish the foregoing objects.

Each connecting member has a first leg located within one of the links of the first row of links and extending in a direction generally transverse to the length of the linkage and a second leg spaced from the first leg for rotatably connecting the connecting member to an adjacent link in the second row of links. Resilient means, preferably flat springs, are located only in the links of the first row of links and they resist displacement of the links of both rows when the linkage is stretched longitudinally from a contracted to an expanded position.

The inner wall of each of the links of the second row of links includes a pair of substantially parallel members generally arcuate in cross section formed as extensions on the outer wall of the link to provide a pair of substantially parallel passages extending inwardly from the end of the link generally transverse to the length of the linkage.

Openings are formed in the walls of these arcuate members. These openings terminate at their outer ends in abutment portions or surfaces which are generally parallel to the length of the linkage.

The second legs of the connecting members extend into said passages and are adapted to rotate therein. These legs are each provided with a protrusion which extends into one of said openings and cooperates with the outer end of said opening to prevent the accidental withdrawal of the connecting member from the linkage.

According to the preferred embodiment of this invention the legs of the connecting members which extend into the links of the first row of links are straight and relatively thin heightwise of the links.

According to another embodiment of this invention each of the first row of links is provided with an ornamental top shell secured to it by tabs.

In a linkage embodying this invention, the connecting members are securely held in the links by engagement of the protrusions of the second legs with the outer ends of the openings in the walls of said arcuate members.

The linkage is thin because there are springs only in the upper links and the first legs of the connecting members are thin heightwise of the links.

The linkage is inexpensive to manufacture because there are springs located in only one row of links, the connecting members, springs and links can be mass produced and the elements can be economically and automatically assembled into the final product.

BRIEF DESCRIPTION OF THE DRAWINGS

In the drawings:

FIG. 1 is a fragmental side view partly in section showing part of the linkage with the parts in their contracted positions, the section being taken on the lines 1—1 of FIG. 7;

FIG. 2 is a view similar to FIG. 1 but showing the parts in expanded positions, the section being taken on the lines 2—2 of FIG. 8;

FIG. 3 is a top plan view of the intermediate parts of FIG. 1, partly in section taken on the lines 3—3 of FIG. 1;

FIG. 4 is a top plan view of the intermediate parts of FIG. 2, partly in section taken on the lines 4—4 of FIG. 2;

FIG. 5 is a view in perspective of the spring used in the top links;

FIG. 6 is a view in perspective of the connecting member used for the main part of the linkage;

FIG. 7 is an enlarged cross section taken on the lines 7—7 of FIG. 1;

FIG. 8 is an enlarged cross section taken on the lines 8—8 of FIG. 2;

DETAILED DESCRIPTION OF THE PREFERRED EMBODIMENTS

Figure 9:
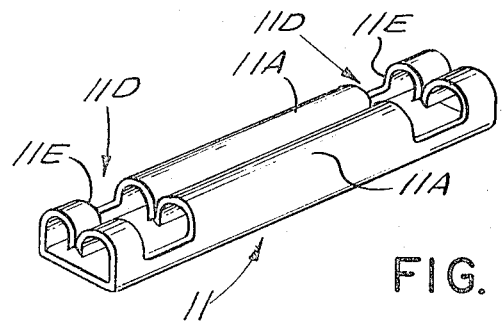
FIG. 9 is a perspective of a bottom link before assembly with the connecting members.
Figure 10:
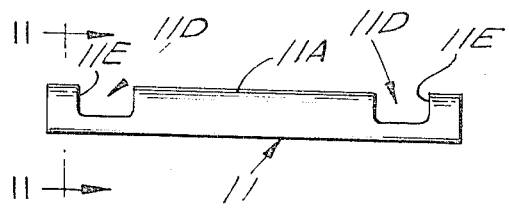
FIG. 10 is a side view of the bottom link shown in FIG. 9.

Referring to FIGS. 1 to 12 of the drawings, the linkage comprises a row of top links 10 and a row of bottom linke 11 connected together by U-shaped connecting members 14 each of which has legs 15 and 16 connected together by an end piece 14A.

The links 10 of the top row of links are staggered with relation to and overlap the links 11 of the bottom row lengthwise of the linkage. The links of both rows extend in a direction generally transverse to the length of the linkage when viewed from the top as in FIGS. 3 and 4.

The top links 10 may be made from stainless steel, gold filled stock or any other suitable material. The bottom links 11 may be made of stainless steel or any other suitable material.

Each link of each row is pivotally connected with the two adjacent links of the adjacent row by means of four connecting members 14 having first legs 15 and second legs 16 which extend within the links in a direction generally transverse to the length of the linkage. The first legs 15' of two of the four connecting members are located within a link of the first row of links near one end thereof, the second leg 16 of one of these connecting members is located within an adjacent link of the second row of links and the second leg 16 of the other connecting member is located within another adjacent link of the second row. The other two connecting members are located near the opposite side of the linkage and their legs are located within the links near their opposite ends in the same way.

The flat spring 12 (FIG. 5) may be made of any suitable corrosion, set and fatigue resistant material such as spring temper stainless steel. The springs 12 are located in the links of only the first row of links 10.

The connecting members 14 may be made of stainless steer or Monel wire, Monel being an alloy which is about 66% nickel and 35% copper.

Each connecting member includes an end piece 14A which is disposed at the side of the linkage. A first leg 15 extends inwardly from the end piece 14A and, in the assembled linkage, these first legs are disposed in the links 10 of the first row of links and generally transversely to the length of the linkage.

Each flat spring 12 has end portions 12R and 12B which are narrower than the intermediate portion of the spring and which extend towards the side of the linkage at an acute angle to the plane of the outer walls of the links 10. The inner walls of the links 10 are provided with recesses 10A and 10B (FIGS. 7 and 8) which are narrower than said inner walls and wider than the narrow end portions 12A and 12B of the springs. When the linkage is in fully expanded position these end portions 12A and 12B enter the recesses 10A and 10B as shown in FIG. 8.

The inner wall of each of the links 11 of the second row of links includes a pair of substantially parallel members 11A which are generally arcuate in cross section and are formed as extensions on the outer wall 11B of the link to provide a pair of substantially parallel passages 11C extending inwardly from the ends of the link generally transverse to the length of the linkage.

Openings 11D are formed in the walls of these arcuate members. These openings terminate at their outer ends in abutment portions or surfaces 11E which are disposed in planes which are generally parallel to the length of the linkage.

The second legs 16 of the connecting members extend into the passages 11C and are adapted to rotate therein. These legs are each provided with a protrusion 16A which extends into one of the openings 11D and cooperates with the outer end 11E of the opening to prevent the accidental withdrawal of the connecting member from the linkage. The junction 16B between the protrusion 16A and the outer portion 16C of the second leg is arcuate in longitudinal section of the leg.

To form an expansible linkage into a watch bracelet, hollow end connectors such as 30 (FIGS. 1 and 2) are attached to the opposite ends of a linkage of appropriate length. The end connector 30 is connected to the end top link 10 by a connecting member 40 which has a shorter end piece 40A than the end piece 14A of the standard connecting members and has a lower leg which is relatively straight. The lower leg is gripped by the extension element 31 of the end connector 30 as is well known in the art.

Figure 11:
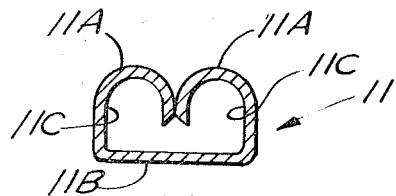
FIG. 11 is an enlarged cross section taken on the lines 11—11 of FIG. 10.
Figure 12:
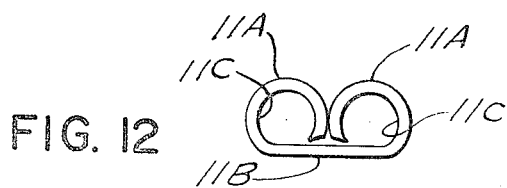
FIG. 12 is an enlarged end view of a bottom link with its arcuate inner wall members shown in their positions after the depression of said walls by a closing punch.

To assemble the linkage of the main part of the bracelet, the springs and connecting members are inserted in the links and then with the linkage expanded the arcuate walls of the links of the second row of links are depressed from their positions shown in FIG. 11 to their positions shown in FIG. 12 thereby causing the protrusion 16A to enter the openings 11D of the arcuate members. This may be accomplished by a punch having grooves in its lower surface to receive the arcuate members and depress them uniformly and quickly.

Figure 13:
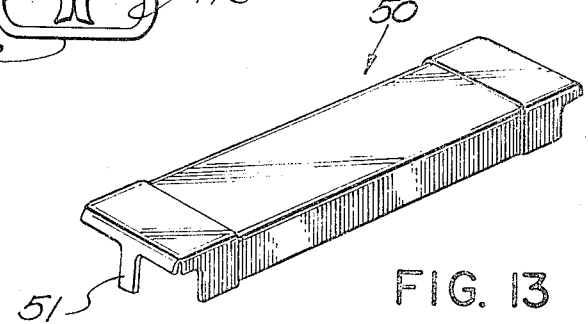
FIG. 13 is a perspective of an ornamental top shell which may be added to the top links of the linkage to provide different designs for the ornamental surface of the linkage.

An ornamental top shell 50 which may be made of gold filled or stainless steel material is shown in FIG. 13. This shell may be assembled to a top link 10 by bending the end tabs 51 inwardly and upwardly between the ends 14A of a pair of connecting members so that it grips the bottom surface of the top wall of the link. The use of such top shells permits the economical conversion of basic linkages into different ornamental designs for the top links which are exposed to view in use.

It is therefore apparent that in an expansible linkage made according to this invention the connecting members are held in the linkage securely yet their legs are easily rotatable in the links. Because there are no springs in the links of the second row of links and the legs of the connecting members in the first row are straight and thin the final linkage is thin. Furthermore, the linkage is inexpensive to manufacture because no springs are required in the second row of links, the connecting members, links and springs can be mass produced and it is economical to assemble the components into the final linkage.

In addition, the linkage has enough expansibility to permit separate top shells to be assembled about the top links and still provide a linkage which when attached to a wristwatch has sufficient expansibility to be slipped on and off the wrist of the wearer.

While two desirable embodiments of the invention have been shown in the drawings, it is to be understood that this disclosure is for the purpose of illustration only and that various changes in shape, proportion and arrangement of parts as well as the substitution of equivalent elements for those herein shown and described, may be made without departing from the spirit and scope of the invention as set forth in the appended claims.

We claim:

1. An expansible linkage including in combination,
    two rows of overlapping staggered links, each link extending in a direction generally transverse to the length of the linkage,
    means interconnecting each of the links of the first row with the links of the other row to provide displacement of the links relative to each other lengthwise of the linkage when the linkage is stretched longitudinally from a contracted to an expanded position, said interconnecting means comprising a pair of connecting members, each connecting member having a first leg located within one of said links of the first row of links and extending in a direction generally transverse to the length of the linkage and a second leg spaced from the first leg for rotatably connecting the connecting member to an adjacent link in the other row of links, and
    resilient means associated with each of the links in the first row of links for resisting said displacement of said links,
    wherein the improvement comprises,
    the inner wall of each of the links of the other row of links comprising a pair of substantially parallel members generally arcuate in cross section formed as extensions on the outer wall of the link to provide a pair of substantially parallel passages extending inwardly from the end of the link generally transverse to the length of the linkage.,
    openings in the walls of said arcuate members, said openings terminating at their outer ends in abutment members which are generally parallel to the length of the linkage, and
    said second legs of said connecting members extending into said passages and adapted to rotate therein, said legs being provided with protrusions which extend into said openings and cooperate with said outer ends of said openings to prevent the accidental withdrawal of the connecting members from the linkage.

2. An expansible linkage according to claim 1 wherein the links in said first row of links and said first legs are substantially rectangular in cross section.

3. An expansible linkage according to claim 2 wherein the said resilient means is a flat spring, said first legs are substantially straight and are positioned between the outer wall of said link of the first row of links and the adjacent end portion of the flat spring.

4. An expansible linkage according to claim 1 wherein the inner ends of said second legs extend beyond the inner ends of said openings.

5. An expansible linkage according to claim 4 wherein said second legs are substantially rectangular in cross section.

6. An expansible linkage according to claim 1 wherein the junction between each protrusion and the outer portion of each second leg is arcuate in longitudinal section of the leg.

7. An expansible linkage according to claim 1 wherein the outer ends of said openings comprise surfaces which are in a plane which is generally parallel to the length of the linkage.

8. An expansible linkage according to claim 1 wherein at least the outer portions of the walls of said arcuate members are depressed relative to said second legs after said second legs have been inserted into said passages with their protrusions registering with said openings in said arcuate members.

References Cited

UNITED STATES PATENTS

| | | | |
|---|---|---|---|
| 2,689,450 | 9/1954 | Stiegele | 59—79 |
| 2,957,303 | 10/1960 | Sasaki | 59—79 |
| 3,307,348 | 3/1967 | Vanover | 59—79 |
| 3,324,649 | 6/1967 | Carlson | 59—79 |

CHARLES W. LANHAM, Primary Examiner

G. P. CROSBY, Assistant Examiner